J. I. ARBOGAST.
METHOD OF MANUFACTURING GLASS CASE GOODS.
APPLICATION FILED JULY 16, 1910.
1,002,955.
Patented Sept. 12, 1911.
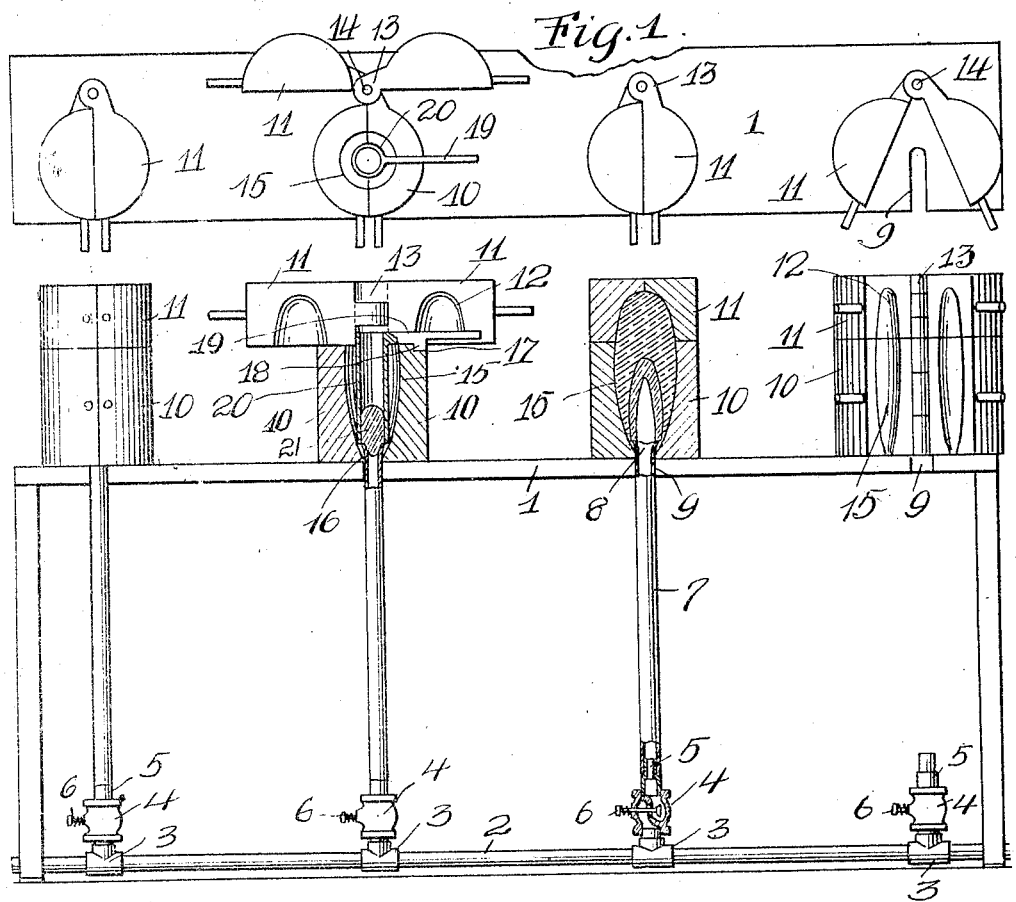
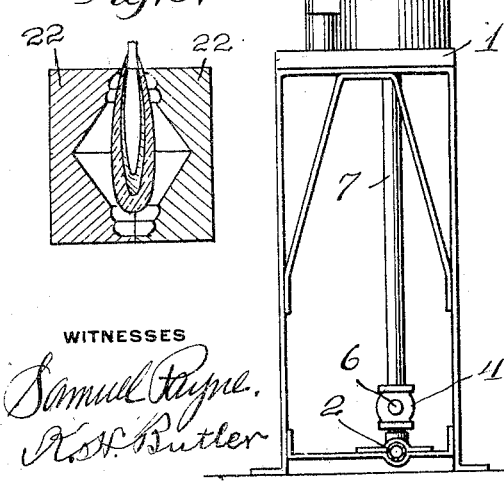
WITNESSES
Samuel Payne
Rob't Butler
INVENTOR
John I. Arbogast
Attorneys.

UNITED STATES PATENT OFFICE.

JOHN I. ARBOGAST, OF PITTSBURG, PENNSYLVANIA, ASSIGNOR OF ONE-HALF TO HENRY L. COLLINS, OF PITTSBURG, PENNSYLVANIA.

METHOD OF MANUFACTURING GLASS CASE GOODS.

1,002,955. Specification of Letters Patent. Patented Sept. 12, 1911.

Application filed July 16, 1910. Serial No. 572,256.

*To all whom it may concern:*

Be it known that I, JOHN I. ARBOGAST, a citizen of the United States of America, residing at S. S. Pittsburg, in the county of Allegheny and State of Pennsylvania, have invented certain new and useful Improvements in Methods of Manufacturing Glass Case Goods, of which the following is a specification, reference being had therein to the accompanying drawing.

This invention relates to a method of manufacturing vitreous case goods, especially that class of glass ware heretofore produced by uniting two separate grades of molten glass to form an article having an interior color or finish different from the exterior color or finish of the ware.

The primary object of this invention is to obviate the necessity of using two masses or batches of molten glass in the production of case goods by simply using one mass of molten glass and treating the same whereby the article produced will have the same appearance and effect as though two masses of molten glass were used, thereby dispensing with approximately one-half the operations heretofore incurred by the use of two masses of molten glass.

A further object of the invention is to partially complete a piece of ware in such a manner that it can be easily decorated and finished to present any design desired, the completed ware having an artistic and attractive finish representing the highest degree of skill in this particular art, yet being produced by ordinary glass-house laborers not skilled in any particular line or grade of ware.

A still further object of the invention is to provide means as will be hereinafter set forth for producing glass balls, shades, globes, and other spherical hollow glass ware having fluorescent and opalescent properties distinguished from ordinary case goods on account of the solidity of color, and combined refractory and resplendent qualities.

With these and such other objects in view as may hereinafter appear, reference will now be had to the drawing, where there is illustrated means capable of accomplishing the above results.

In the drawing: Figure 1 is a plan of an apparatus in accordance with this invention. Fig. 2 is a front elevation of the same partly broken away and partly in section. Fig. 3 is an end view of the same. Fig. 4 is a perspective view of an auxiliary mold forming part of the apparatus, and Fig. 5 is a vertical sectional view of a blow mold.

Before describing the details of construction entering into the apparatus, it is thought best to outline briefly the steps I take in connection with the apparatus in producing a piece of ware.

First, I disintegrate and pulverize a mass of opaque glass, this being expeditiously accomplished by gathering a mass of molten glass, depositing the same in water and then crushing the cooled glass until a powder is obtained. A combined machine and hand blow pipe having a flared end is now employed and the flared end of the pipe heated and placed in a suitable blank mold. An auxiliary mold is placed in the blank mold, over the flared end of the pipe and then the powdered opal glass deposited in the auxiliary mold to adhere to the heated end of the blow pipe and form a batch foundation of glass upon the end of the pipe. Air is then admitted to the pipe to partially blow the batch foundation and with the core partly completed, a mass of molten glass is deposited upon the batch foundation to complete the batch, another supply of air admitted to the blow pipe to complete the core, and then the core and pipe are removed, inverted in a blow mold, and the core manually blown to produce the ware. While this is the preferable procedure, approximately the same resultant can be obtained by reversing the first few steps of the method, and thereby dispensing with the auxiliary mold and permit an operator to decorate a piece of ware according to his esthetic taste. For instance, a mass of molten glass constituting in this instance a batch foundation can be deposited in the blank mold upon the heated end of the blow pipe, the core partially formed or blown, and then the powdered opal glass distributed upon the partially blown batch foundation to complete the batch. The other steps of the method can then be successively performed as above recited.

The apparatus comprises a stand 1, preferably oblong to accommodate blank molds used in the production of the ware and to facilitate the various steps of the method. Arranged below the stand is an air supply pipe 2 provided with a plurality of T's 3 supporting valves 4. These valves are provided with air outlet nipples 5 and the passage of air through said valves is controlled by a normally closed spring-held valve stem 6 arranged whereby a pressure of the foot will open the valve 4 and allow air to pass therethrough.

Detachably mounted upon the nipples 5 of the valves 4 are interchangeable blow pipes 7, constituting machine and hand blow pipes. The upper end of each pipe is flared, as at 8, and extends through a slot 9 provided therefor in the forward edge of the stand 1, the end of each pipe protruding above the stand.

Arranged upon the stand are a plurality of blank molds, but as these molds are identical in construction, it is only necessary to describe one of said molds. The blank mold comprises base sections 10 and top sections 11 having apertured lugs 13 by which said sections are pivotally mounted upon a post 14, carried by the stand 1. The base sections 10 have the confronting sides thereof recessed, as at 15, and cut-away, as at 16, to provide clearance for the upper flared end of the blow pipe 7. The confronting faces of the top sections 11 are recessed, as at 12, and when the base and top sections are closed a cavity is formed within the mold.

One of the base sections 10 has the upper edge thereof notched, as at 17, to receive a depending lug 18, carried by the handle 19 of a tubular auxiliary mold 20. This mold is placed in the base sections 10 of the blank mold, after they are closed, and upon the upper flared end 8 of the pipe 7.

Prior to placing the blow pipe 7 in position, the flared end thereof is thoroughly heated, and after the auxiliary mold 20 has been placed upon the flared end, the powdered opaque glass is deposited in the auxiliary mold 20 and as it impinges the hot end of the blow pipe 7, it adheres thereto and forms within the auxiliary mold 20 a plastic batch foundation 21. As the auxiliary mold 20 is removed a pressure of air is admitted to the pipe 7 to partially blow the batch foundation 21. The auxiliary mold 20 prevents the mass of glass 21 from contacting with the walls of the recesses 15, and correctly positions the mass whereby when the air engages the same it will be elongated or forced upwardly within the blank mold. This is all accomplished with the top sections 11 open and immediately upon the batch foundation being partially blown, a mass of molten glass is placed in the base sections 10, upon the partially blown batch foundation to complete the core, the top sections 11 closed, and then a second pressure of air admitted to the blow pipe 7 to blow the complete batch into the recesses 12 of the top sections 11 to form the core. The core is now completed and by opening the sections 10 and 11, the blow pipe 7 and the core can be removed. The next step is to "warm in" or again heat the core while it adheres to the end of the pipe 7. After being warmed in the core is inverted in a blow mold 22 and is manually blown therein to form a piece of ware having an interior finish that differentiates from the exterior finish in color and in quality.

As heretofore stated, it is possible to place the molten glass upon the end of the blow pipe and after partially forming the core to deposit the powdered opaque glass upon the batch before further blowing the same, in which instance it would not be necessary to use the auxiliary mold.

It will be observed from the foregoing that my invention is a radical departure from the present method of manufacturing case goods, the principle involving the use of a powdered glass for producing the batch foundation and employing a combined machine and hand blow pipe that permits of a piece of ware being made at a comparatively small cost and with that degree of certainty that the waste is reduced to a minimum.

What I claim, is:

A method of manufacturing glass case goods consisting of heating the outlet end of a blow pipe to a temperature capable of melting a mass of powdered glass, then positioning said pipe with the heated end up into a core forming mold, then forming within the mold directly upon and by the heated end of said pipe from a mass of powdered glass a batch foundation spaced throughout from the walls of the mold, then surrounding the batch foundation with a mass of plastic glass of a different character from that of the batch foundation to complete the batch, then forcing air through said pipe to form the batch into a core, then positioning the pipe with the core thereon in a blow mold, and then blowing through the pipe to complete the article in the blow mold.

In testimony whereof I affix my signature in the presence of two witnesses.

JOHN I. ARBOGAST.

Witnesses:
 Max H. Srolovitz,
 K. H. Butler.